(12) United States Patent
Renke et al.

(10) Patent No.: US 9,908,512 B2
(45) Date of Patent: Mar. 6, 2018

(54) VEHICLE AND A FLUSH MOUNT WASHER ASSEMBLY

(71) Applicant: GM GLOBAL TECHNOLOGY OPERATIONS LLC, Detroit, MI (US)

(72) Inventors: David T. Renke, Macomb, MI (US); Jeffrey T. Arnone, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 14/837,450

(22) Filed: Aug. 27, 2015

(65) Prior Publication Data

US 2017/0057466 A1    Mar. 2, 2017

(51) Int. Cl.
  *B60S 1/52* (2006.01)
  *B05B 1/08* (2006.01)
  *B05B 1/10* (2006.01)

(52) U.S. Cl.
  CPC . *B60S 1/52* (2013.01); *B05B 1/08* (2013.01); *B05B 1/10* (2013.01)

(58) Field of Classification Search
  CPC . B60S 1/02–1/606; B05B 15/06–15/08; B05B 1/08; B05B 1/10
  USPC .................. 239/284.1, 284.2, 600
  See application file for complete search history.

(56) References Cited

U.S. PATENT DOCUMENTS

| | | | | |
|---|---|---|---|---|
| 3,056,177 | A * | 10/1962 | Ruhala | B60S 1/48 239/284.1 |
| 2009/0032616 | A1* | 2/2009 | Semmelroth | B60S 1/52 239/284.1 |
| 2011/0101127 | A1* | 5/2011 | Beyer | B60S 1/52 239/284.1 |
| 2016/0207503 | A1* | 7/2016 | Sugai | B60S 1/52 |

FOREIGN PATENT DOCUMENTS

JP        2011006066 A  *  1/2011  ............ B60S 1/52

* cited by examiner

*Primary Examiner* — Christopher Kim
*Assistant Examiner* — Cody Lieuwen
(74) *Attorney, Agent, or Firm* — Quinn IP Law

(57) ABSTRACT

A vehicle includes a pane of glass and a flush mount washer assembly. The flush mount washer assembly includes a panel, and the panel includes an outer surface and an inner surface. The panel defines an aperture through the outer and inner surfaces. The assembly further includes a mount coupled to the inner surface of the panel. The assembly also includes a nozzle secured to the mount. The nozzle includes a show surface substantially aligning with the aperture and positioned such that the show surface does not extend beyond the outer surface of the panel to create a flush exterior appearance of the panel.

18 Claims, 3 Drawing Sheets

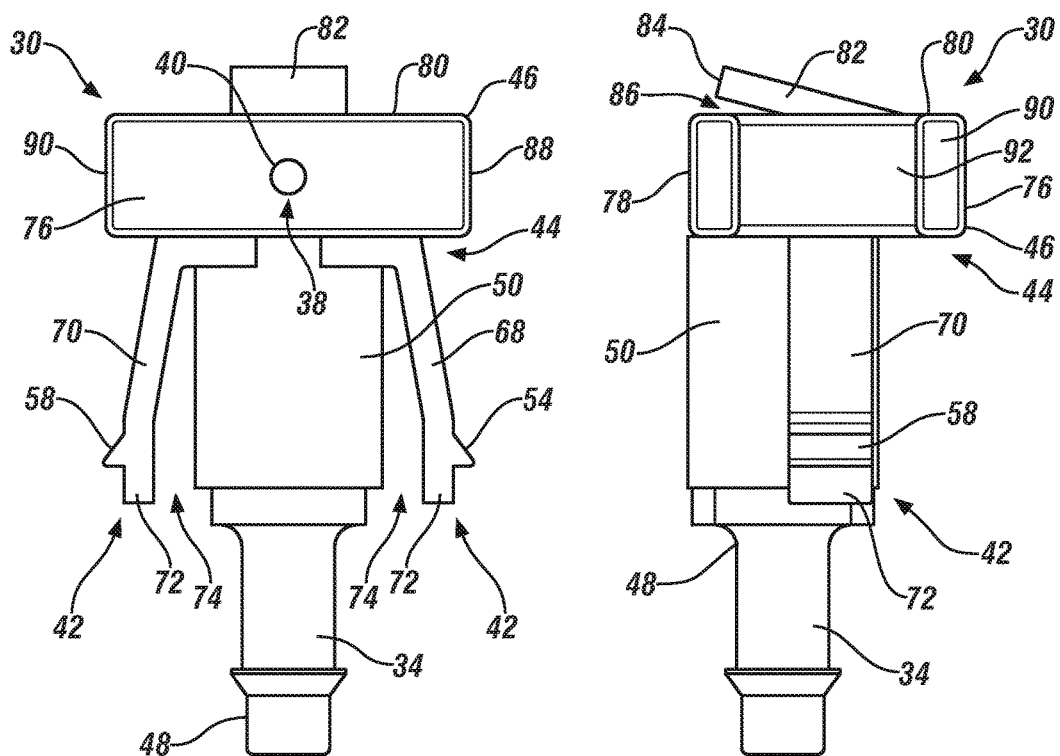
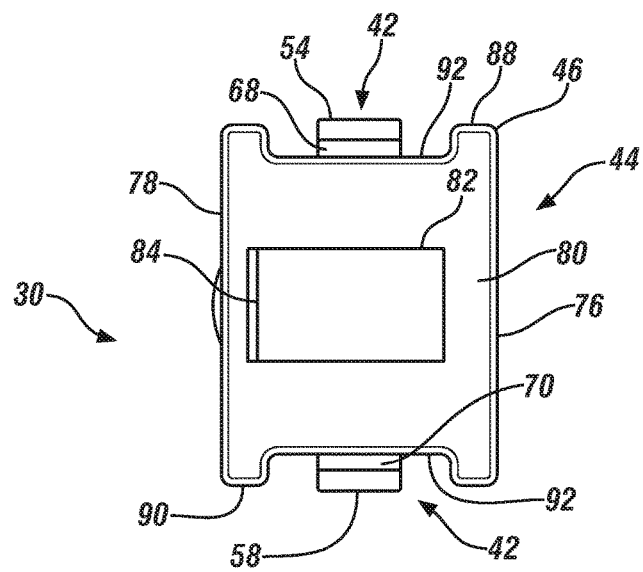

VEHICLE AND A FLUSH MOUNT WASHER ASSEMBLY

TECHNICAL FIELD

The present disclosure relates to a vehicle and a flush mount washer assembly.

BACKGROUND

Vehicles can have nozzles that spray a windshield of the vehicle with a liquid fluid. Generally, the nozzles protrude from an outer surface of a panel. Therefore, the nozzle is exposed and visible from the outer surface of the panel. An ice scraper or a brush can engage the exposed nozzle.

Some panels have been designed with an outer surface that defines an indentation that the nozzle sits in. However, the nozzle protrudes from the outer surface, and thus, is exposed and visible from the outer surface of the panel. Additionally, this type of nozzle is assembled to the panel from the outer surface of the panel.

SUMMARY

The present disclosure provides a flush mount washer assembly including a panel. The panel includes an outer surface and an inner surface, with the panel defining an aperture through the outer and inner surfaces. The assembly further includes a mount coupled to the inner surface of the panel. The assembly also includes a nozzle secured to the mount. The nozzle includes a show surface substantially aligning with the aperture and positioned such that the show surface does not extend beyond the outer surface of the panel to create a flush exterior appearance of the panel.

The present disclosure further provides a flush mount washer assembly including a panel, a mount and a nozzle. The panel includes an outer surface and an inner surface. Furthermore, the panel defines an aperture through the outer and inner surfaces. The mount includes a first leg and a second leg each extending outwardly relative to the inner surface of the panel. The nozzle includes a show surface substantially aligning with the aperture and positioned such that the show surface does not extend beyond the outer surface of the panel to create a flush exterior appearance of the panel. The nozzle also includes a first projection engaging the first leg and a second projection engaging the second leg to secure the nozzle to the mount such that the show surface substantially aligns with the aperture to create the flush exterior appearance.

The present disclosure also provides a vehicle including a pane of glass and a flush mount washer assembly. The assembly includes a panel. The panel includes an outer surface and an inner surface. The panel defines an aperture through the outer and inner surfaces, and the aperture faces the pane of glass. The assembly also includes a mount coupled to the inner surface of the panel. The assembly further includes a nozzle secured to the mount. The nozzle includes a show surface substantially aligning with the aperture and positioned such that the show surface does not extend beyond the outer surface of the panel to create a flush exterior appearance of the panel.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 8 is a schematic front side view of the nozzle.

FIG. 9 is a schematic side view of the nozzle.

FIG. 10 is a schematic top side view of the nozzle.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
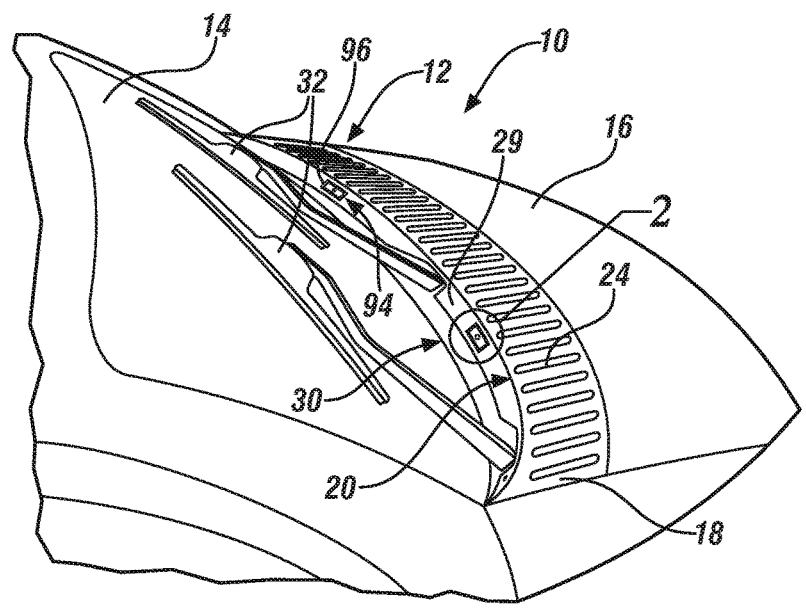
FIG. 1 is a schematic fragmentary perspective view of a vehicle and a flush mount washer assembly.

Referring to the Figures, wherein like numerals indicate like or corresponding parts throughout the several views, a vehicle 10 and a flush mount washer assembly 12 are generally shown in FIG. 1.

The vehicle 10 can include the flush mount washer assembly 12. The vehicle 10 can be an automotive vehicle, such as, a car, a truck, etc. It is to be appreciated that the vehicle 10 can alternatively be a non-automotive vehicle, such as, a farm vehicle, a marine vehicle, an aviation vehicle, etc. It is to be appreciated that the flush mount washer assembly 12 can be utilized with any other suitable vehicle or non-vehicle that can utilize such flush mount washer assembly 12 as disclosed herein.

Continuing with FIG. 1, the vehicle 10 includes a pane of glass 14. The pane of glass 14 can be any suitable configuration and location. For example, in a vehicle application, the pane of glass 14 can be a windshield, a rear window, etc. Furthermore, the pane of glass 14 can be formed of any suitable materials. Generally, the pane of glass 14 is formed of one or more materials that allow visibility through the pane of glass 14.

Again, continuing with FIG. 1, the vehicle 10 can include a body panel 16. The body panel 16 can be any suitable configuration and location. For example, in a vehicle application, the body panel 16 can be a hood, a rear panel, a trunk lid, etc. The flush mount washer assembly 12 is generally disposed between the pane of glass 14 and the body panel 16.

Referring to FIGS. 1-4, the flush mount washer assembly 12 includes a panel 18. The panel 18 is generally disposed between the pane of glass 14 and the body panel 16. The panel 18 can be any suitable configuration. The panel 18 includes an outer surface 20 (see FIGS. 1 and 2) and an inner surface 22 (see FIGS. 3 and 4). The outer surface 20 is visible from, for example, the outside or exterior of the vehicle 10. Accordingly, the inner surface 22 is not visible from the outside or exterior of the vehicle 10. Therefore, the outer surface 20 of the panel 18 covers the inner surface 22, and thus, the inner surface 22 is not visible from the exterior of the vehicle 10. The panel 18 can define a plurality of slits 24 spaced from each other which allows a fluid, such as air, through the panel. Therefore, the panel 18 can be referred to as an air inlet panel.

Figure 3:
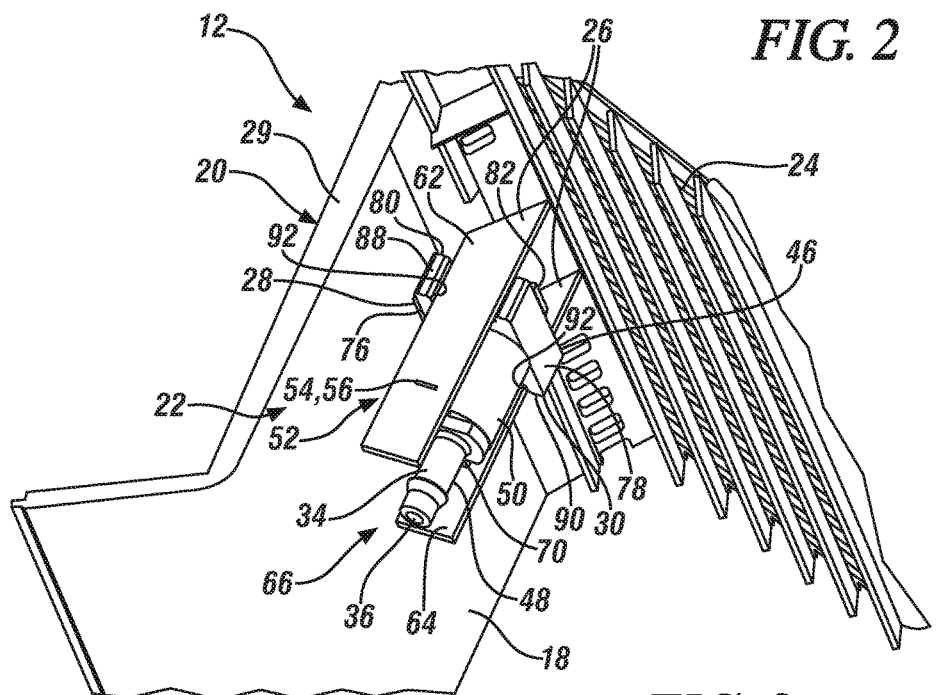
FIG. 3 is a schematic fragmentary perspective view of an inner surface of a panel with a nozzle secured to a mount in an assembled position.
Figure 4:
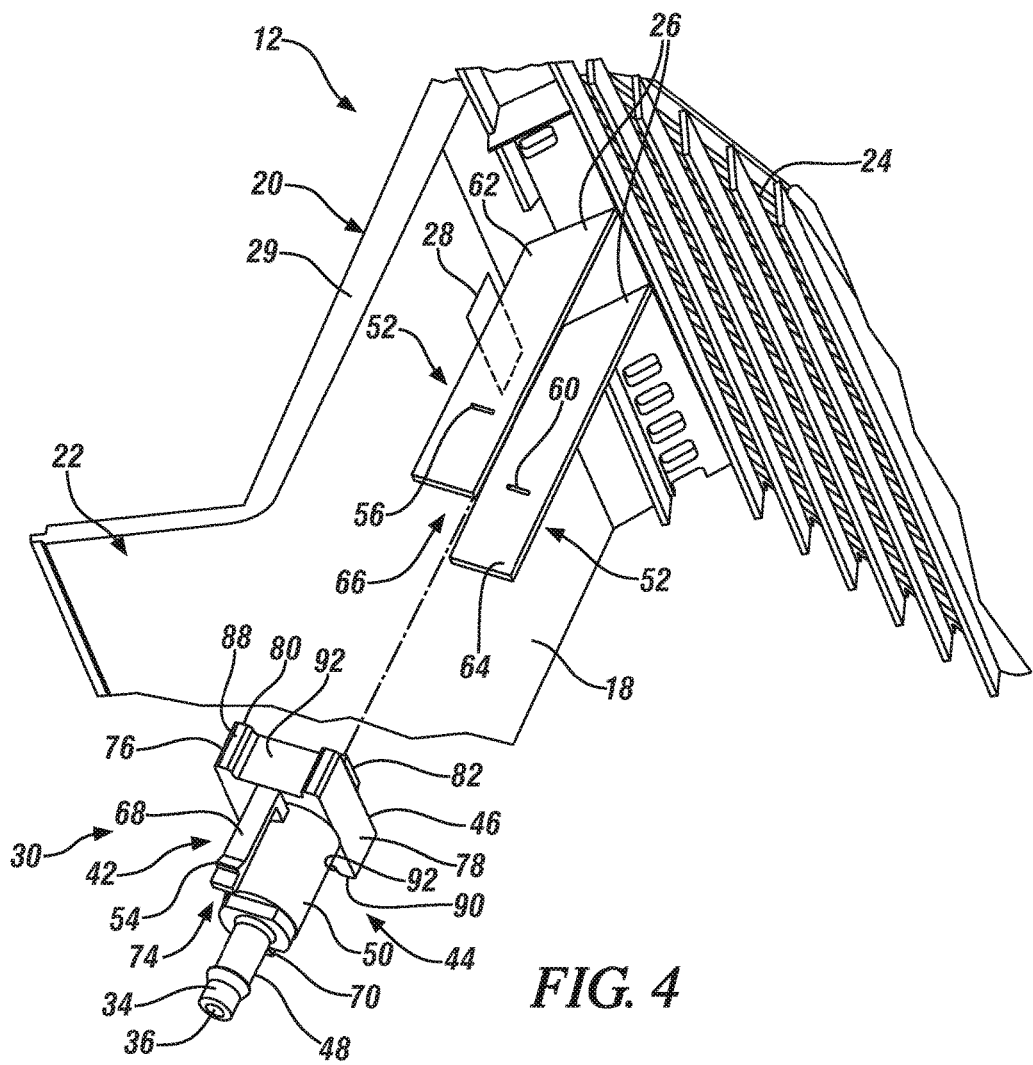
FIG. 4 is a schematic fragmentary perspective view of the panel from FIG. 3 with the nozzle spaced from the mount in a preassembled position.

Referring to FIGS. 3 and 4, the flush mount washer assembly 12 further includes a mount 26 coupled to the inner surface 22 of the panel 18. The mount 26 can be coupled to the inner surface 22 by fasteners, welding, adhesive or be integral with the inner surface 22 of the panel 18. The features of the mount 26 will be discussed further below.

Turning to FIGS. 2, 4 and 5-7, the panel 18 defines an aperture 28 through the outer and inner surfaces 20, 22. The aperture 28 can be any suitable configuration and location through the panel 18. Generally, the aperture 28 faces the pane of glass 14. Therefore, the panel 18 can include a lip 29 that faces the pane of glass 14 and the aperture 28 is defined through the lip 29.

As best shown in FIGS. 3 and 4, the flush mount washer assembly 12 also includes a nozzle 30 secured to the mount 26. The nozzle 30 guides a liquid fluid therethrough and expels the liquid fluid toward the pane of glass 14. The liquid fluid contacts the pane of glass 14, and for example, a wiper 32 (see FIG. 1) can move along the pane of glass 14 to remove the liquid fluid and clean the pane of glass 14. Therefore, for example, the liquid fluid is sprayed onto the pane of glass 14.

Continuing with FIGS. 3 and 4, the nozzle 30 can include a connector 34 defining an inlet 36 for allowing fluid communication into the nozzle 30. Generally, a hose is attached to the connector 34 for guiding the liquid fluid to the connector 34. The hose is also attached to a reservoir that stores extra liquid fluid until that liquid fluid is to be used on the pane of glass 14. An actuator, such as a pump, can be utilized to force the liquid fluid through the hose and the nozzle 30.

Figure 2:
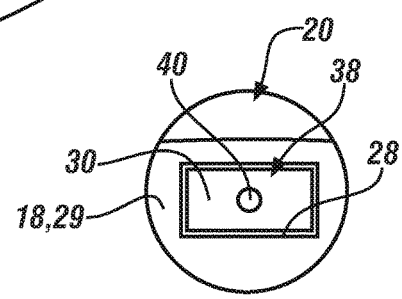
FIG. 2 is a schematic enlarged view of the circled area 2 taken from FIG. 1.

Referring to FIGS. 2 and 5-8, the nozzle 30 includes a show surface 38 substantially aligning with the aperture 28 and positioned such that the show surface 38 does not extend beyond the outer surface 20 of the panel 18 to create a flush exterior appearance of the panel 18. Therefore, as shown in FIG. 2, the panel 18 covers the nozzle 30 such that only the show surface 38 is visible from the outer surface 20 of the panel 18. The flush exterior appearance can improve the aesthetic appearance of the vehicle 10. Furthermore, by positioning the show surface 38 such that the show surface 38 does not extend beyond the outer surface 20, the nozzle 30 is protected from engagement by an ice scraper, brush or other object(s) when clearing the pane of glass 14 or other activity to the exterior of the vehicle 10. Simply stated, the nozzle 30 is positioned out of the way from the exterior of the vehicle 10.

Figure 5:
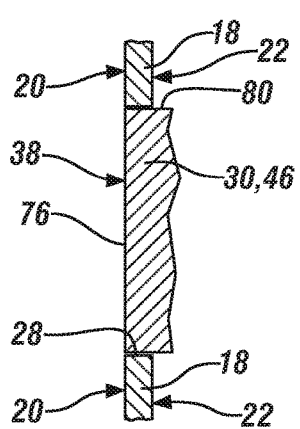
FIG. 5 is a schematic fragmentary cross-sectional view of the panel and the nozzle, with a show surface of the nozzle aligning with the aperture and the show surface aligning with an outer surface of the panel.
Figure 6:
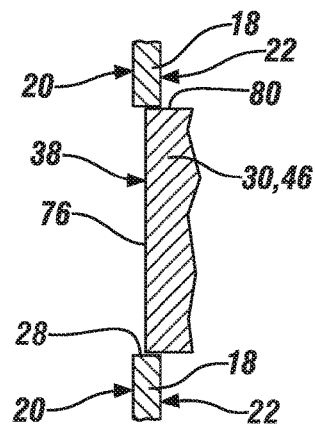
FIG. 6 is a schematic fragmentary cross-sectional view of the panel and the nozzle, with the show surface of the nozzle aligning with the aperture and the show surface recessed between the outer surface and the inner surface.
Figure 7:
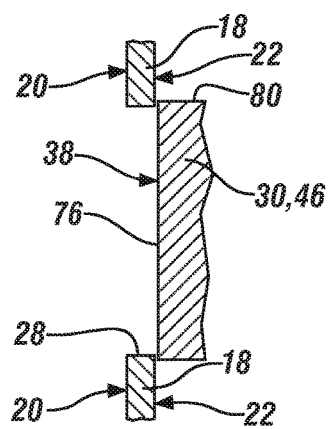
FIG. 7 is a schematic fragmentary cross-sectional view of the panel and the nozzle, with the show surface of the nozzle aligning with the aperture and the show surface disposed behind the outer surface and the inner surface.

The position of the show surface 38 relative to the outer surface 20 can be in different locations to create the flush exterior appearance. For example, as shown in FIG. 5, the outer surface 20 that surrounds the aperture 28 substantially aligns with the show surface 38 of the nozzle 30 to create the flush exterior appearance. As another example, as shown in FIG. 6, the show surface 38 can be recessed in the aperture 28 such that the show surface 38 is disposed between the outer and inner surfaces 20, 22 to create the flush exterior appearance. As yet another example, as shown in FIG. 7, the show surface 38 can be recessed behind the aperture 28 to create the flush exterior appearance. The cross-sectional views of FIGS. 5-7 are enlarged for illustrative purposes.

As best shown in FIGS. 2 and 8, the show surface 38 can define an outlet 40 for providing fluid communication outside of the nozzle 30. For example, the liquid fluid is expelled out of the outlet 40. Therefore, the liquid fluid can flow into the nozzle 30 through the inlet 36 of the connector 34 and out the nozzle 30 through the outlet 40. The outlet 40 aligns with the aperture 28 for providing fluid communication through the aperture 28. Therefore, when the liquid fluid is expelled out the outlet 40, the panel 18 does not interfere with the liquid fluid reaching the pane of glass 14. In certain embodiments, the outlet 40 can be further defined as a plurality of outlets 40. It is to be appreciated that any suitable number of outlets 40 can be utilized.

Turning to FIGS. 4 and 8, the nozzle 30 can include an attachment feature 42 that engages the mount 26 to secure the nozzle 30 relative to the panel 18 such that the show surface 38 substantially aligns with the aperture 28. The nozzle 30 can include a body 44 having a first portion 46, a second portion 48 and a middle portion 50 disposed between the first and second portions 46, 48. In one configuration, the show surface 38 is disposed on the first portion 46 of the body 44, and the middle portion 50 of the body 44 can include the attachment feature 42. Furthermore, in certain embodiments, the second portion 48 can include the connector 34 defining the inlet 36 for allowing fluid communication into the nozzle 30.

Referring to FIGS. 3 and 4, the mount 26 can include a retention feature 52. The attachment feature 42 and the retention feature 52 engage each other to secure the nozzle 30 to the mount 26. The attachment feature 42 and the retention feature 52 can be any suitable configuration and location to secure the nozzle 30 in the desired position relative to the aperture 28. Specifically, the attachment and retention features 42, 52 cooperate to secure the nozzle 30 to the mount 26 such that the show surface 38 substantially aligns with the aperture 28.

The attachment and retention features 42, 52 can be in any suitable configuration and location, and one non-limiting example is illustrated in the Figures and discussed further below. For example, as best shown in FIG. 4, one of the attachment feature 42 and the retention feature 52 can include a first projection 54 and the other one of the attachment feature 42 and the retention feature 52 defines a first slot 56. The first projection 54 engages the first slot 56 to secure the nozzle 30 to the mount 26.

In certain embodiments, one of the attachment feature 42 and the retention feature 52 can further include a second projection 58 (best shown in FIG. 8) and the other one of the attachment feature 42 and the retention feature 52 can further define a second slot 60. The second projection 58 engages the second slot 60 to secure the nozzle 30 to the mount 26. Generally, the first and second projections 54, 58 are spaced from each other and the first and second slots 56, 60 are spaced from each other. The first and second projections 54, 58 can substantially align with each other in a spaced relationship, and similarly, the first and second slots 56, 60 can substantially align with each other in a spaced relationship.

Continuing with FIG. 4, for example, the retention feature 52 can also include a first leg 62 defining the first slot 56. In certain embodiments, the retention feature 52 can further include a second leg 64 defining the second slot 60. The first and second legs 62, 64 are spaced from each other to define a space 66 between the first and second legs 62, 64. Therefore, in certain embodiments, the first and second legs 62, 64 align with each other in a spaced relationship. The nozzle 30 is at least partially disposed in the space 66 (see FIG. 3).

In certain embodiments, the mount 26 can include the first and second legs 62, 64 and the nozzle 30 can include the first and second projections 54, 58. Each of the legs 62, 64 can extend outwardly relative to the inner surface 22 of the panel 18, and the first projection 54 can engage the first leg 62 and the second projection 58 can engage the second leg 64 to secure the nozzle 30 to the mount 26 such that the show surface 38 substantially aligns with the aperture 28 to create the flush exterior appearance. Therefore, the nozzle 30 can snap fit to the mount 26.

Additionally, as best shown in FIG. 8, in certain embodiments, the attachment feature 42 can also include a first arm 68, with the first arm 68 including the first projection 54. In certain embodiments, the attachment feature 42 can include a second arm 70 spaced from the first arm 68, with the second arm 70 including the second projection 58. In certain embodiments, the first and second arms 68, 70 extend away from the first portion 46, and the first and second projections 54, 58 are spaced from the middle portion 50.

Generally, the first and second arms 68, 70 extend to respective ends 72 that are spaced from the body 44, with the first and second projections 54, 58 extending from respective ends 72 of the respective arms 68, 70. Therefore, an opening 74 is defined between the respective ends 72 and the body 44 of the nozzle 30 such that the respective ends 72 can bias back and forth relative to the middle portion 50. Generally, the first and second arms 68, 70 are biasable such that the first and second arms 68, 70 retract relative to the mount 26 when the first and second projections 54, 58 are not aligned with the respective first and second slots 56, 60, and the first and second arms 68, 70 move outwardly away from each other when the first and second projections 54, 58 align with the respective first and second slots 56, 60. Simply stated, the first and second projections 54, 58 engage respective first and second legs 62, 64 which cause the arms 68, 70 to retract until the projections 54, 58 engage the respective slots 56, 60 which allows the arms 68, 70 to bias back outwardly. Therefore, the first and second projections 54, 58 snap fit into the respective slots 56, 60.

Therefore, before the nozzle 30 is secured to the mount 26, the nozzle 30 is in a preassembled position (see FIG. 4). When assembling the nozzle 30 to the panel 18, the nozzle 30 is inserted in the space 66 between the first and second legs 62, 64. As the nozzle 30 moves upwardly toward the inner surface 22 in the space 66, the projections 54, 58 engage the mount 26 which causes the arms 68, 70 to bias toward the middle portion 50. As the nozzle 30 continues to move upwardly, the projections 54, 58 engage the respective slots 56, 60 which allows the arms 68, 70 to bias away from the middle portion 50 and positions the projections 54, 58 at least partially into respective slots 56, 60 which secures the nozzle 30 to the mount 26 in an assembled position (see FIG. 3).

Referring to FIGS. 8-10, the nozzle 30 can include a front side 76 and a back side 78 opposing the front side 76. More specifically, in certain embodiments, the first portion 46 of the nozzle 30 can include the front side 76 and the back side 78 opposing the front side 76. The show surface 38 can be disposed along the front side 76, and only the show surface 38 is visible from the outer surface 20 of the panel 18 as discussed above.

The first portion 46 can include a top side 80 disposed between the front and back sides 76, 78. Generally, the top side 80 is spaced from the middle portion 50. Furthermore, the top side 80 faces away from the middle portion 50. The top side 80 can be any suitable configuration.

Continuing with FIGS. 8-10, the top side 80 can include an extension 82 extending outwardly away from the middle portion 50. Therefore, the extension 82 extends from the top side 80 to a distal end 84, with the distal end 84 spaced from the top side 80. As such, a gap 86 is defined between the distal end 84 and the top side 80 such that the distal end 84 of the extension 82 can bias back and forth relative to the top side 80.

Generally, the extension 82 engages the inner surface 22 of the panel 18 when the nozzle 30 is secured to the mount 26 to bias the nozzle 30 away from where the extension 82 engages the inner surface 22 to minimize axial movement of the nozzle 30 relative to the mount 26. More specifically, the extension 82 engages the inner surface 22 of the panel 18 when the nozzle 30 is secured to the mount 26 to bias the nozzle 30 away from where the extension 82 engages the inner surface 22 which applies a force to the first and second projections 54, 58 within the respective first and second slots 56, 60 to minimize axial movement of the nozzle 30 relative to the mount 26 which assists in maintaining the position of the show surface 38 relative to the aperture 28. Specifically, the distal end 84 of the extension 82 engages the inner surface 22 of the panel 18 when the nozzle 30 is secured to the mount 26.

Continuing with FIGS. 8-10, the first portion 46 can also include a first side 88 and a second side 90 opposing the first side 88. The first and second sides 88, 90 are disposed between the front and back sides 76, 78. The first and second sides 88, 90 can each define a recess 92. The first and second legs 62, 64 are disposed in the respective recess 92 of the first and second sides 88, 90 to minimize rotation of the nozzle 30 relative to the mount 26. Therefore, when attaching the nozzle 30 to the mount 26, the first leg 62 aligns with one of the recesses 92 and the second leg 64 aligns with the other one of the recesses 92 and then the nozzle 30 is guided through the space 66 between the legs 62, 64 to the assembled position. As the nozzle 30 moves between the legs 62, 64, the recesses 92 minimize rotation of the nozzle 30 relative to the legs 62, 64 which assists in maintaining the position of the show surface 38 relative to the aperture 28. Once the attachment and retention features 42, 52 engage each other, the nozzle 30 is secured to the mount 26 in an assembled position. When the nozzle 30 is in the assembled position, the show surface 38 substantially aligns with the aperture 28.

The configuration of the nozzle 30 and the mount 26 described herein allows the nozzle 30 to be manufactured as a common part across different vehicle models which can reduce manufacturing costs. Additionally, the configuration of the nozzle 30 and the mount 26 described herein provides a common interface across the different vehicle models which can minimize performing future validation work. In addition, the configuration of the mount 26 provides an assembly process from the inner surface 22 of the panel 18 instead of from the outer surface 20 of the panel 18. Furthermore, the configuration of the nozzle 30 and the mount 26 described herein provides a quick snap fit of the nozzle 30 to the mount 26 which can improve the assembly process. Also, the configuration of the nozzle 30 and the mount 26 described herein minimizes the packaging space needed for the nozzle 30.

The nozzle 30 can be defined as a first nozzle 30, the aperture 28 of the panel 18 can be defined as a first aperture 28 and the mount 26 can be defined as a first mount 26. In certain embodiments, the flush mount washer assembly 12 can include a second nozzle 94 (see FIG. 1) spaced from the first nozzle 30, and the panel 18 can define a second aperture 96 (see FIG. 1) spaced from the first aperture 28. The second nozzle 94 can have the same features discussed above for the first nozzle 30, and will not be re-discussed. The show surface 38 of the second nozzle 94 can substantially align with the second aperture 96 as similarly discussed above for the first nozzle 30, and will not be re-discussed. Furthermore, the flush mount washer assembly 12 can include a second mount spaced from the first mount 26. The second mount can have the same features discussed above for the first mount 26, and will not be re-discussed. It is to be appreciated that any suitable number of nozzles 30, 94, apertures 28, 96 and mounts 26 can be utilized.

The nozzles 30, the panel 18 and the mounts 26 can be formed of any suitable materials.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A flush mount washer assembly comprising:
 a panel including an outer surface and an inner surface, with the panel defining an aperture through the outer and inner surfaces;
 a mount coupled to the inner surface of the panel; and
 a nozzle secured to the mount and including a show surface substantially aligning with the aperture and positioned such that the show surface does not extend beyond the outer surface of the panel to create a flush exterior appearance of the panel;
 wherein:
  the nozzle includes an attachment feature that engages the mount to secure the nozzle relative to the panel such that the show surface substantially aligns with the aperture;
  the mount includes a retention feature, with the attachment feature and the retention feature engaging each other to secure the nozzle to the mount;
  one of the attachment feature and the retention feature includes a first projection and the other one of the attachment feature and the retention feature defines a first slot, with the first projection engaging the first slot to secure the nozzle to the mount;
  the retention feature includes a first leg defining the first slot, and the attachment feature includes a first arm, with the first arm including the first projection;
  one of the attachment feature and the retention feature includes a second projection and the other one of the attachment feature and the retention feature defines a second slot, with the second projection engaging the second slot to secure the nozzle to the mount;
  the retention feature includes a second leg defining the second slot, with the first and second legs spaced from each other to define a space between the first and second legs, and with the nozzle at least partially disposed in the space;
  the attachment feature includes a second arm spaced from the first arm, with the second arm including the second projection;
  the nozzle includes a body having a first portion, a second portion and a middle portion disposed between the first and second portions, with the show surface disposed on the first portion of the body, and the middle portion of the body includes the attachment feature;
  the first portion includes a front side and a back side opposing the front side, with the show surface disposed along the front side;
  the first portion includes a top side disposed between the front and back sides, with the top side spaced from the middle portion;
  the top side includes an extension extending outwardly away from the middle portion, with the extension engaging the inner surface of the panel when the nozzle is secured to the mount to bias the nozzle away from where the extension engages the inner surface which applies a force to the first and second projections in the respective first and second slots to minimize axial movement of the nozzle relative to the mount;
  the first portion includes a first side and a second side opposing the first side, with the first and second sides disposed between the front and back sides; and
  the first and second sides each define a recess, with the first and second legs disposed in the respective recess of the first and second sides to minimize rotation of the nozzle relative to the mount.

2. The assembly as set forth in claim 1 wherein the outer surface surrounding the aperture substantially align with the show surface of the nozzle to create the flush exterior appearance.

3. The assembly as set forth in claim 1 wherein the show surface is recessed in the aperture such that the show surface is disposed between the outer and inner surfaces to create the flush exterior appearance.

4. The assembly as set forth in claim 1 wherein the show surface defines an outlet for providing fluid communication outside of the nozzle, with the outlet aligning with the aperture for providing fluid communication through the aperture.

5. The assembly as set forth in claim 1 wherein:
 the first and second arms extend away from the first portion, and the first and second projections are spaced from the middle portion; and
 the first and second arms are bias able such that the first and second arms retract relative to the mount when the first and second projections are not aligned with the respective first and second slots, and the first and second arms move outwardly away from each other when the first and second projections align with the respective first and second slots.

6. The assembly as set forth in claim 1 wherein only the show surface visible from the outer surface of the panel.

7. The assembly as set forth in claim 1 wherein the panel covers the nozzle such that only the show surface is visible from the outer surface of the panel.

8. The assembly as set forth in claim 1
wherein the first and second arms are disposed inside the space between the first and second legs.

9. The assembly as set forth in claim 8 wherein the first portion aligns with the aperture of the panel, and the second and middle portions do not align with the aperture of the panel.

10. The assembly as set forth in claim 8 wherein the top side is spaced from the first and second arms, and wherein the extension directly engages the inner surface of the panel.

11. The assembly as set forth in claim 10 wherein the extension extends to a distal end spaced from the top side to define a gap between the distal end and the top side.

12. The assembly as set forth in claim 8 wherein the first slot does not align with the aperture of the panel, and the second slot does not align with the aperture of the panel.

13. The assembly as set forth in claim 1 wherein the flush mount washer assembly is utilized in a vehicle, and wherein the vehicle includes a pane of glass, with the aperture of the panel facing the pane of glass, and
wherein the top side is spaced from the first and second arms, and wherein the extension directly engages the inner surface of the panel.

14. The assembly as set forth in claim 13 wherein the vehicle includes a body panel, with the panel of the flush mount washer assembly being generally disposed between the pane of glass and the body panel.

15. The assembly as set forth in claim 13 wherein the panel covers the nozzle such that only the show surface is visible from the outer surface of the panel.

16. The assembly as set forth in claim 13 wherein the first portion aligns with the aperture of the panel, and the second and middle portions do not align with the aperture of the panel.

17. The assembly as set forth in claim 13 wherein the first slot does not align with the aperture of the panel, and the second slot does not align with the aperture of the panel.

18. The assembly as set forth in claim 13 wherein the extension extends to a distal end spaced from the top side to define a gap between the distal end and the top side.

\* \* \* \* \*